United States Patent
Fuse

(10) Patent No.: US 9,182,574 B2
(45) Date of Patent: Nov. 10, 2015

(54) INFRARED FIXED-FOCUS LENS

(71) Applicant: Tamron Co., Ltd., Saitama-shi, Saitama (JP)

(72) Inventor: Shingo Fuse, Kashiwa (JP)

(73) Assignee: TAMRON CO., LTD., Saitama-shi (JP)

( * ) Notice: Subject to any disclaimer, the term of this patent is extended or adjusted under 35 U.S.C. 154(b) by 43 days.

(21) Appl. No.: 13/717,542

(22) Filed: Dec. 17, 2012

(65) Prior Publication Data
US 2013/0182316 A1 Jul. 18, 2013

(30) Foreign Application Priority Data

Jan. 13, 2012 (JP) ................................. 2012-005412

(51) Int. Cl.
*G02B 13/14* (2006.01)
*G02B 13/18* (2006.01)
*G02B 13/00* (2006.01)
*G02B 9/10* (2006.01)
*G02B 9/06* (2006.01)

(52) U.S. Cl.
CPC *G02B 13/14* (2013.01); *G02B 9/10* (2013.01); *G02B 13/003* (2013.01); *G02B 9/06* (2013.01)

(58) Field of Classification Search
CPC .............. G02B 9/00; G02B 9/04; G02B 9/08; G02B 9/10; G02B 13/00; G02B 13/001; G02B 13/0015; G02B 13/003; G02B 13/0055; G02B 13/008; G02B 13/14; G02B 13/143; G02B 13/146

USPC .................................. 359/350–361, 717, 793
See application file for complete search history.

(56) References Cited

U.S. PATENT DOCUMENTS

| | | | | |
|---|---|---|---|---|
| 3,363,962 A * | 1/1968 | Vogl | | 359/356 |
| 3,778,133 A * | 12/1973 | Tatian | | 359/356 |
| 3,992,078 A * | 11/1976 | Freeman et al. | | 359/356 |
| 5,446,581 A * | 8/1995 | Jamieson | | 359/357 |
| 6,292,293 B1 * | 9/2001 | Chipper | | 359/356 |
| 7,672,045 B2 * | 3/2010 | Baker | | 359/356 |
| 2009/0052018 A1 | 2/2009 | Baker | | |
| 2012/0229892 A1 * | 9/2012 | Kang et al. | | 359/356 |

FOREIGN PATENT DOCUMENTS

JP 11-84229 A 3/1999
JP 2010-113191 A 5/2010

* cited by examiner

*Primary Examiner* — Thong Nguyen
(74) *Attorney, Agent, or Firm* — Westerman, Hattori, Daniels & Adrian, LLP

(57) ABSTRACT

The invention provides an infrared fixed-focus lens of which component lens pieces are made of germanium characterized by low chromatic dispersion, and have no surface processed to serve as diffraction optics. The infrared fixed-focus lens comprises a first lens piece disposed closer to an object and of negative power, and a second lens piece disposed closer to the image plane and of positive power. Both the first and second lens pieces are made of germanium.

2 Claims, 16 Drawing Sheets

SPHERICAL ABERRATION (mm)

SPHERICAL ABERRATION (mm)

SPHERICAL ABERRATION (mm)

ASTIGMATISM (mm)

DISTORTION (%)

SPHERICAL ABERRATION (mm)

SPHERICAL ABERRATION (mm)

SPHERICAL ABERRATION (mm)

SPHERICAL ABERRATION (mm)

INFRARED FIXED-FOCUS LENS

CROSS-REFERENCE TO RELATED APPLICATIONS

The present patent application claims priority from Japan Application No. 2012-005412, filed Jan. 13, 2012, which is incorporated herein by reference in its entirety.

FIELD OF THE INVENTION

The present invention relates to an infrared fixed-focus lens, and more particularly, to an infrared fixed-focus lens adopted to suppress spherical aberration at the wide-angle end and suitable to infrared thermography optical systems and surveillance cameras. The term 'infrared' used herein means radiations including middle infrared rays of wavelength ranging from 3000 to 5000 nm and far infrared rays of wavelength ranging from 8000 to 14000 nm.

BACKGROUND OF THE INVENTION

As an example of the prior art infrared lenses capable of producing excellent images and sturdy enough to endure severe environments, an infrared optical system suitable for use in surveillance cameras has been proposed which is compatible with infrared rays through far infrared rays, namely, with a wavelength range from 3 μm to 14 μm, and is of dual-lens configuration where the first lens disposed closer to an object is a convex meniscus lens having its convex surface faced to the object while the second lens disposed closer to the image plane is another convex meniscus lens having its concave surface faced to the object, and at least one of the first and second lenses has its opposite surfaces processed to serve as diffraction optics (See Patent Document 1 or Official Gazette of JP-A-2010-113191).

The infrared optical system disclosed in Patent Document 1 is substantially inappropriate to use for a wide-angle lens since its first lens is the convex meniscus lens. In embodiments in Patent Document 1, all the lenses are made of chalcogenide. Chalcogenide is low in diffractive index and great in chromatic dispersion, and hence, in order to compensate for chromatic aberration, the lens must have its surface(s) processed to serve as diffraction optics. In Patent Document 1, all the embodiments have their respective lens surfaces processed to be diffraction optics.

The present invention is made to overcome the aforementioned disadvantages of the prior art infrared lenses, and accordingly, it is an object of the present invention to provide an infrared fixed-focus lens that is of wide-angle, is made of germanium exhibiting a low chromatic dispersion, and includes no lens pieces with a surface serving as diffraction optics.

SUMMARY OF THE INVENTION

The present invention provides an infrared fixed-focus lens that comprises a first lens piece closer to an object and of negative power and a second lens piece closer to the image plane and of positive power, and that attains a total angle of field of 24 to 55 degrees.

Although it is of dual-lens configuration, the infrared fixed-focus lens according to the present invention has the first or foremost lens piece processed to exhibit negative power, and hence, the lens as a whole can satisfactorily compensate for comatic aberration and distortion while, simultaneously, the second lens piece of positive power is able to satisfactorily compensate for spherical aberration developed in the first lens piece of negative power.

Various aspects of the present invention will be described below.

<1st Aspect of the Invention>

In the infrared fixed-focus lens in one aspect of the invention, the first and second lens pieces are made of germanium. Germanium, which is characterized by high refractive index and low chromatic dispersion, enables compensation for chromatic aberration without any lens surface processed to serve as diffraction optics.

<2nd Aspect of the Invention>

In the infrared fixed-focus lens in another aspect of the invention, the first lens piece has an object-side surface which is convex and exhibits negative power while the second lens piece has an image-side surface which is convex and exhibits positive power.

The infrared fixed-focus lens in accordance with the present invention, although of dual-lens configuration, has the first lens piece processed to exhibit negative power, and hence, the lens as a whole can satisfactorily compensate for comatic aberration and distortion while, simultaneously, the second lens piece of positive power is able to satisfactorily compensate for spherical aberration developed in the first lens piece of negative power.

<3rd Aspect of the Invention>

The infrared fixed-focus lens in still another aspect of the invention meets the requirement as defined in the following formula (1):

$$-4.5 \leq f1/f \leq -1.55 \quad (1)$$

where f1 is a focal length of the first lens piece, and f is a focal length of the entire optics.

The formula (1) provides a condition to suppress field curvature. If the term or the ratio f1/f is smaller or greater to go beyond the lower or upper limit defined in the formula, it becomes hard to correct the field curvature.

<4th Aspect of the Invention>

The infrared fixed-focus lens in further another aspect of the present invention meets the requirement as defined in the following formula (2):

$$0.6 \leq d/f \leq 1.9 \quad (2)$$

where d is a distance from the first lens piece to the second lens piece.

The formula (2) provides a condition in which the second lens piece has a diameter that is not too large, and the lens as a whole has a back focus that is sufficiently long. If the term or the ratio d/f exceeds the upper limit defined in the formula (2), the second lens piece has an excessively large diameter. If d/f is smaller to go beyond the lower limit, the lens as a whole cannot obtain a sufficiently long back focus.

EMBODIMENTS OF THE PRESENT INVENTION

Figure 1:
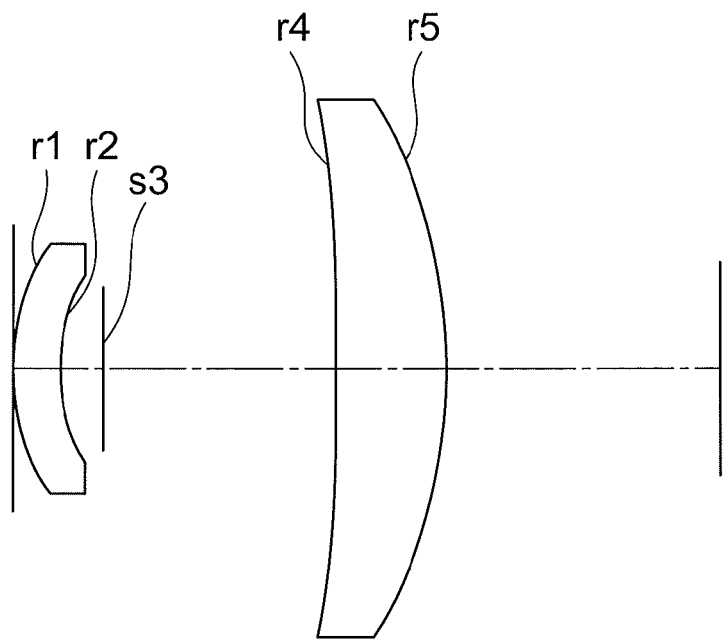
FIG. 1 is a sectional view showing a first embodiment of an infrared fixed-focus lens according to the present invention.
Figure 2:
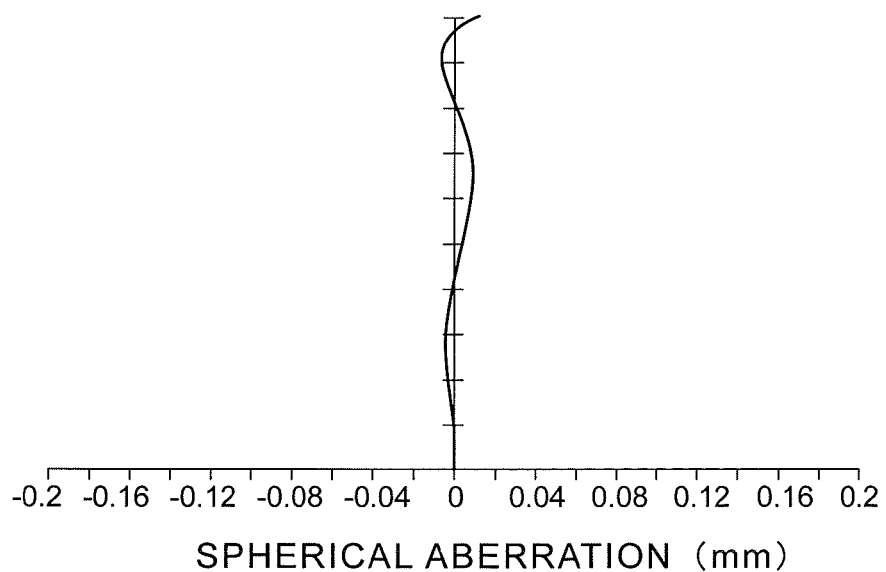
FIG. 2 depicts a graph of spherical aberration developed in the first embodiment of the infrared fixed-focus lens.
Figure 3:
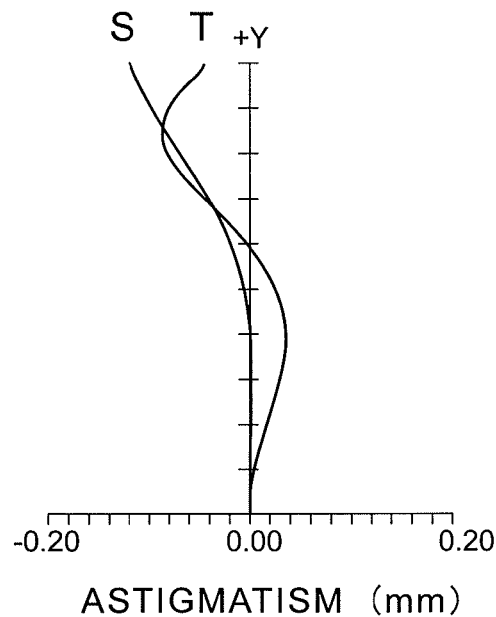
FIG. 3 depicts graphs of astigmatism developed in the first embodiment of the infrared fixed-focus lens.
Figure 4:
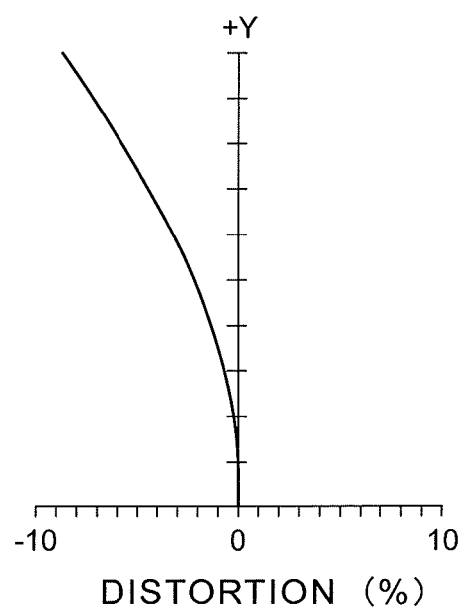
FIG. 4 depicts a graph of distortion developed in the first embodiment of the infrared fixed-focus lens.
Figure 5:
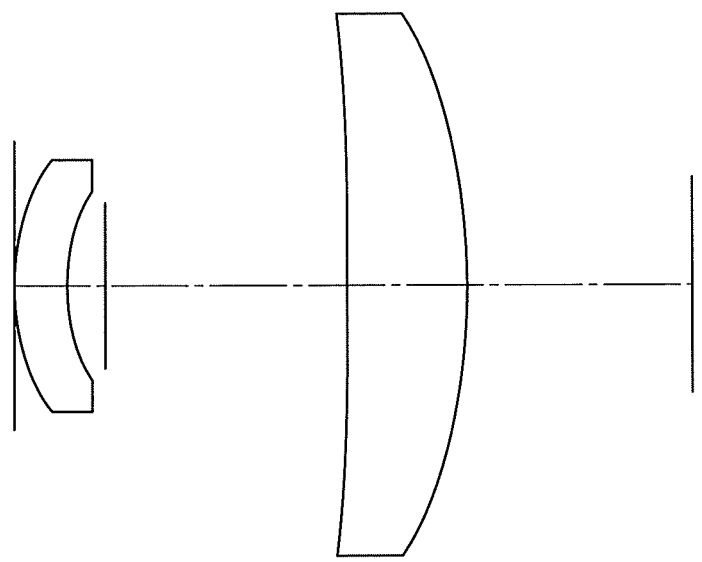
FIG. 5 is a sectional view showing a second embodiment of the infrared fixed-focus lens according to the present invention.
Figure 6:
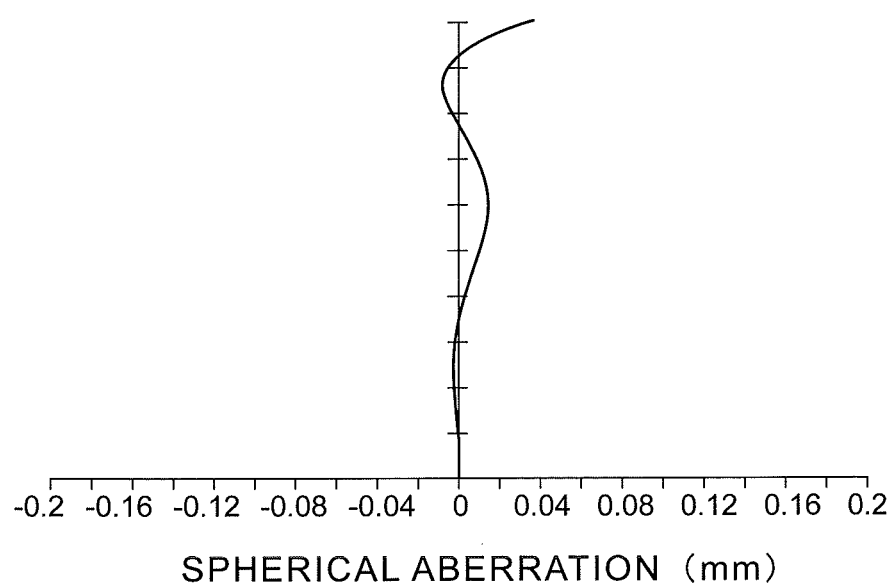
FIG. 6 depicts a graph of spherical aberration developed in the second embodiment of the infrared fixed-focus lens.
Figure 7:
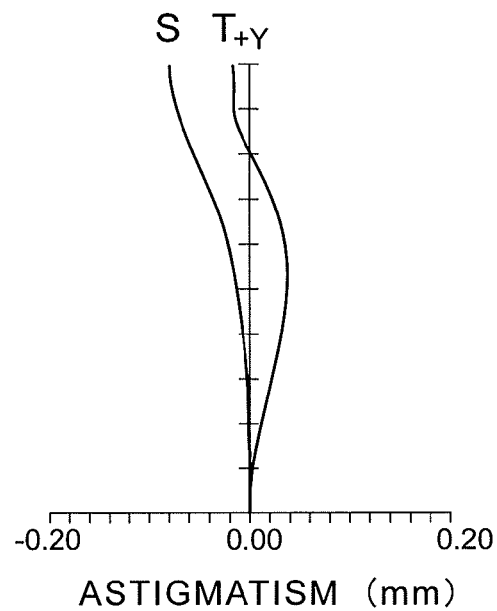
FIG. 7 depicts graphs of astigmatism developed in the second embodiment of the infrared fixed-focus lens.
Figure 8:
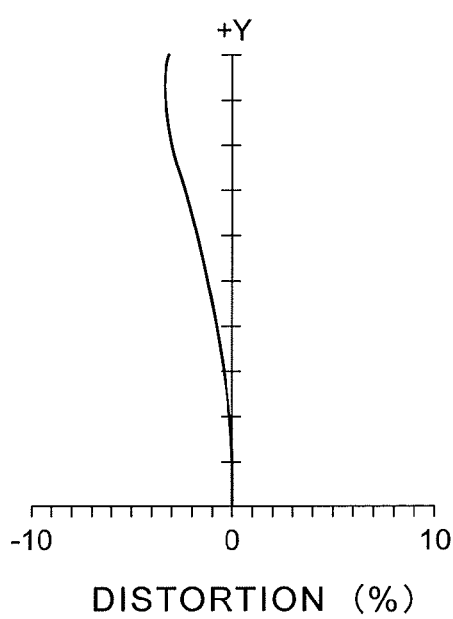
FIG. 8 depicts a graph of distortion developed in the second embodiment of the infrared fixed-focus lens.
Figure 9:
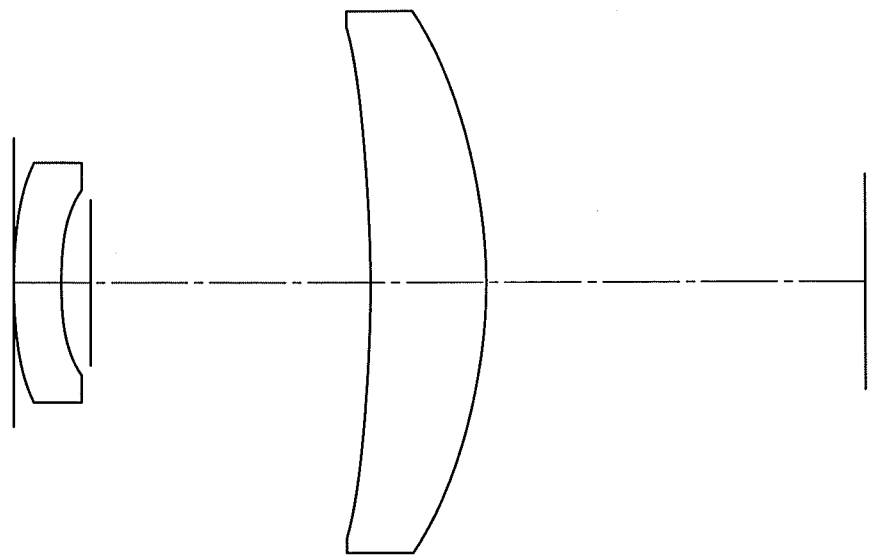
FIG. 9 is a sectional view showing a third embodiment of the infrared fixed-focus lens according to the present invention.
Figure 10:
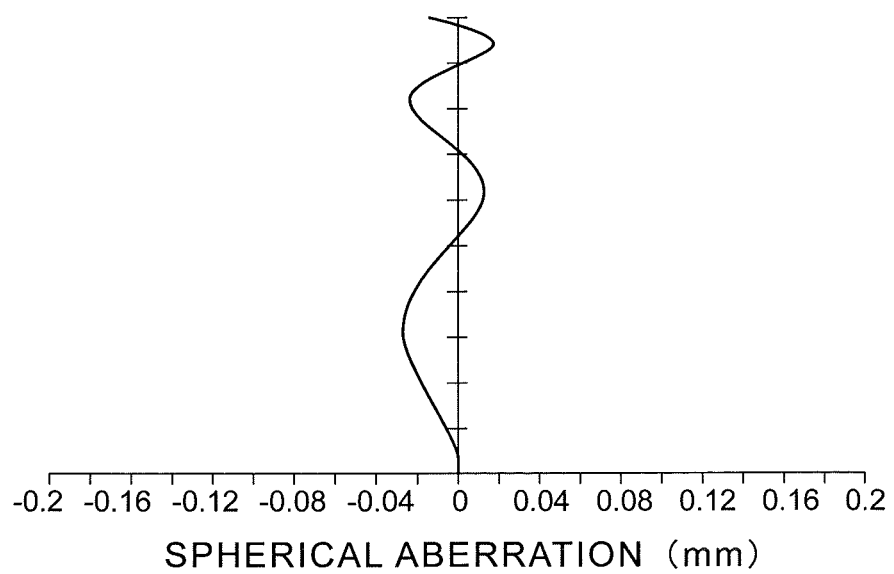
FIG. 10 depicts a graph of spherical aberration developed in the third embodiment of the infrared fixed-focus lens.
Figure 11:
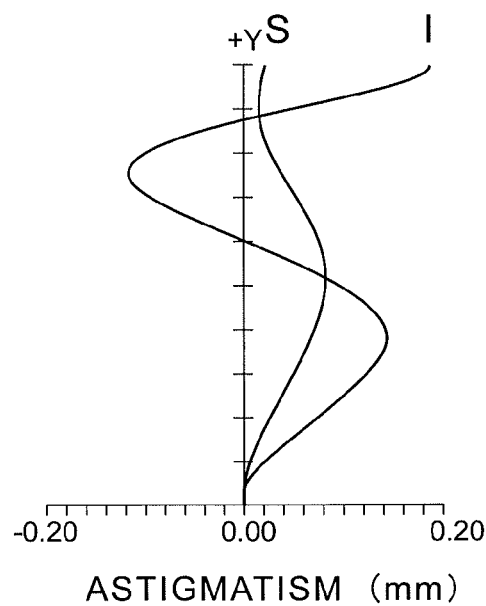
FIG. 11 depicts graphs of astigmatism developed in the third embodiment of the infrared fixed-focus lens.
Figure 12:
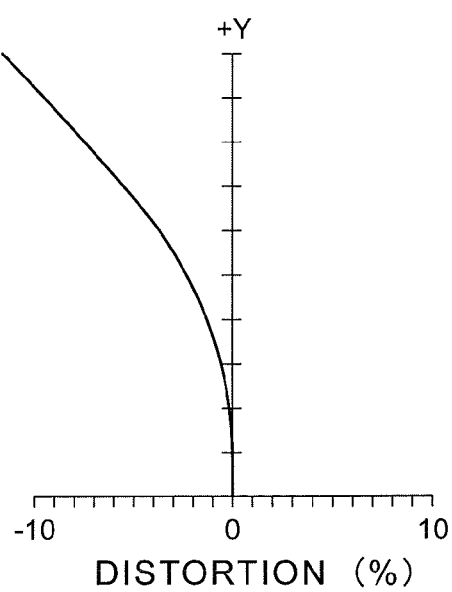
FIG. 12 depicts a graph of distortion developed in the third embodiment of the infrared fixed-focus lens.
Figure 13:
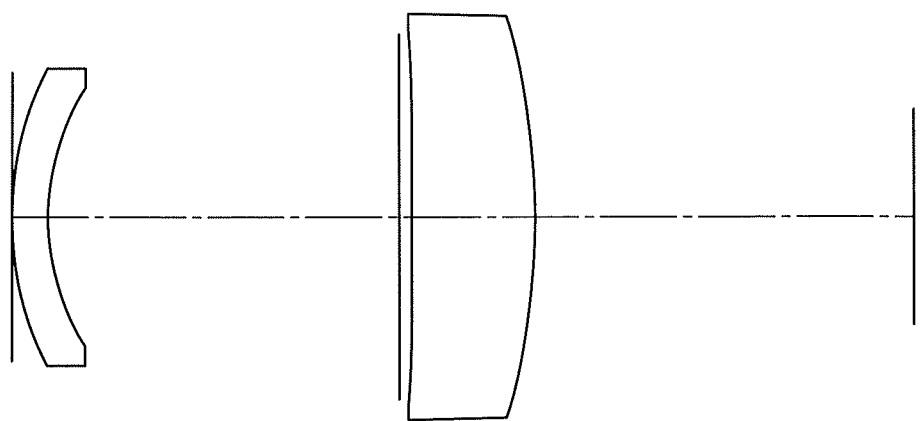
FIG. 13 is a sectional view showing a fourth embodiment of the infrared fixed-focus lens according to the present invention.
Figure 14:
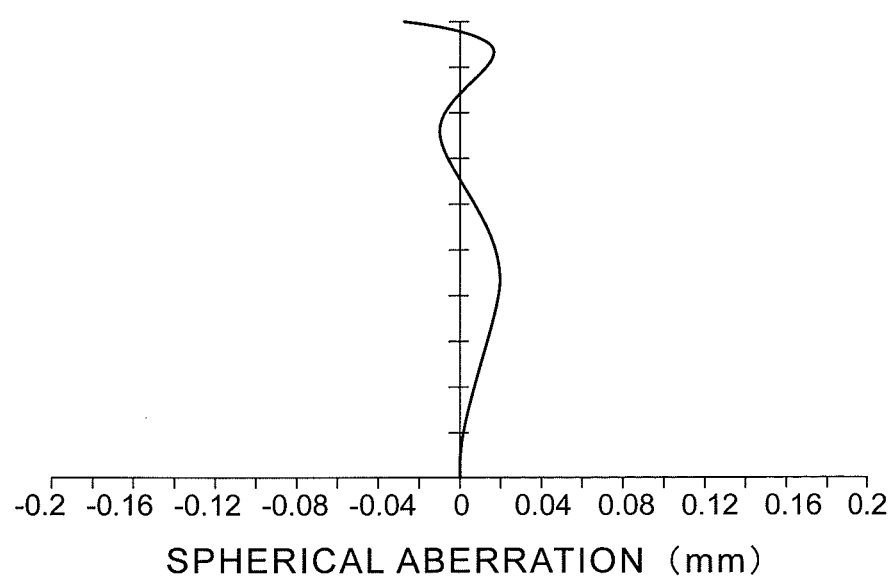
FIG. 14 depicts a graph of spherical aberration developed in the fourth embodiment of the infrared fixed-focus lens.
Figure 15:
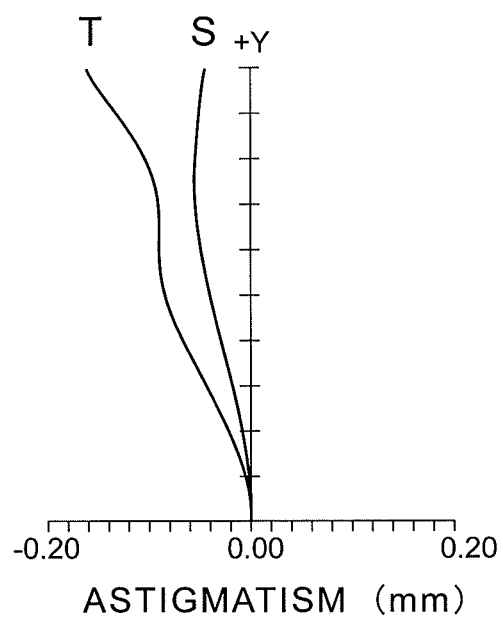
FIG. 15 depicts graphs of astigmatism developed in the fourth embodiment of the infrared fixed-focus lens.
Figure 16:
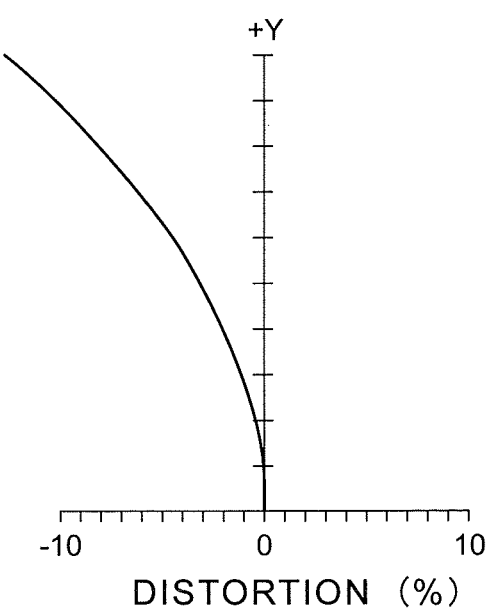
FIG. 16 depicts a graph of distortion developed in the fourth embodiment of the infrared fixed-focus lens.
Figure 17:
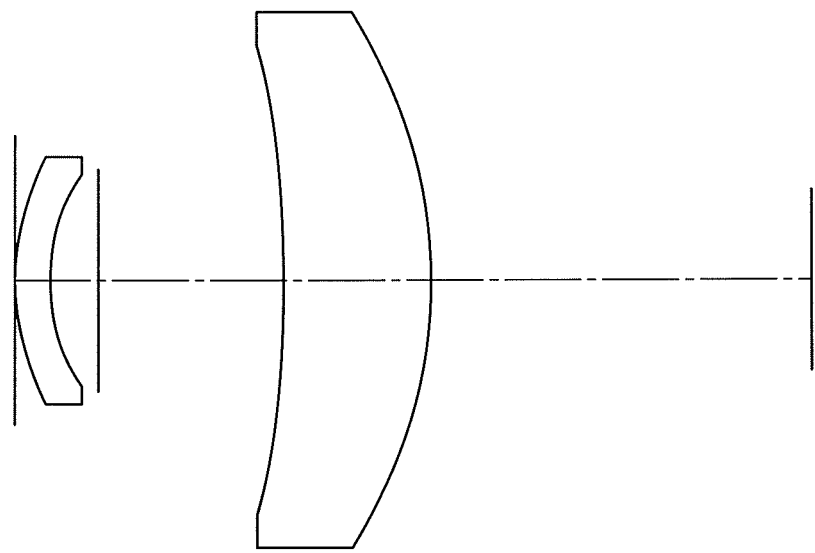
FIG. 17 is a sectional view showing a fifth embodiment of the infrared fixed-focus lens according to the present invention.
Figure 18:
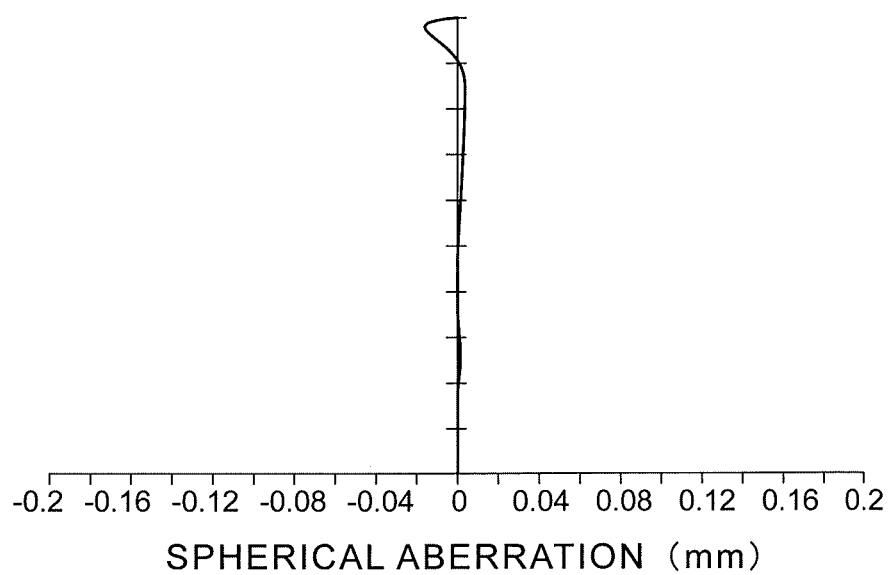
FIG. 18 depicts a graph of spherical aberration developed in the fifth embodiment of the infrared fixed-focus lens.
Figure 19:
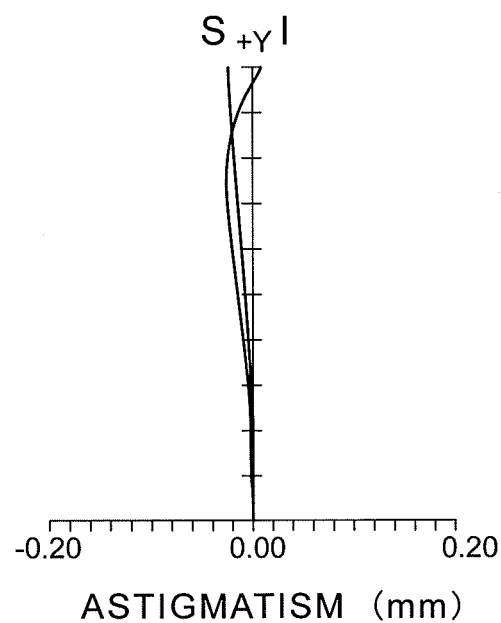
FIG. 19 depicts graphs of astigmatism developed in the fifth embodiment of the infrared fixed-focus lens.
Figure 20:
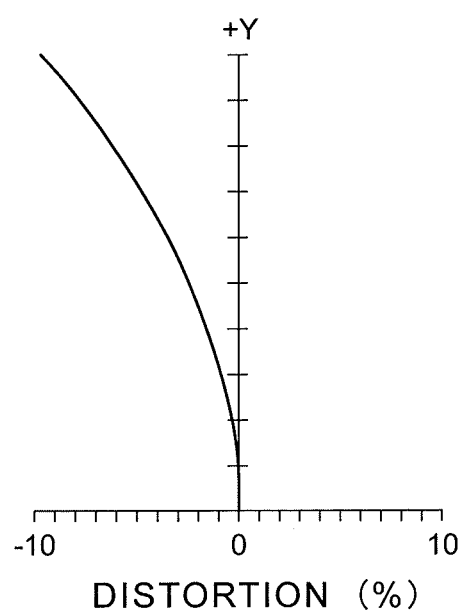
FIG. 20 depicts a graph of distortion developed in the fifth embodiment of the infrared fixed-focus lens.
Figure 21:
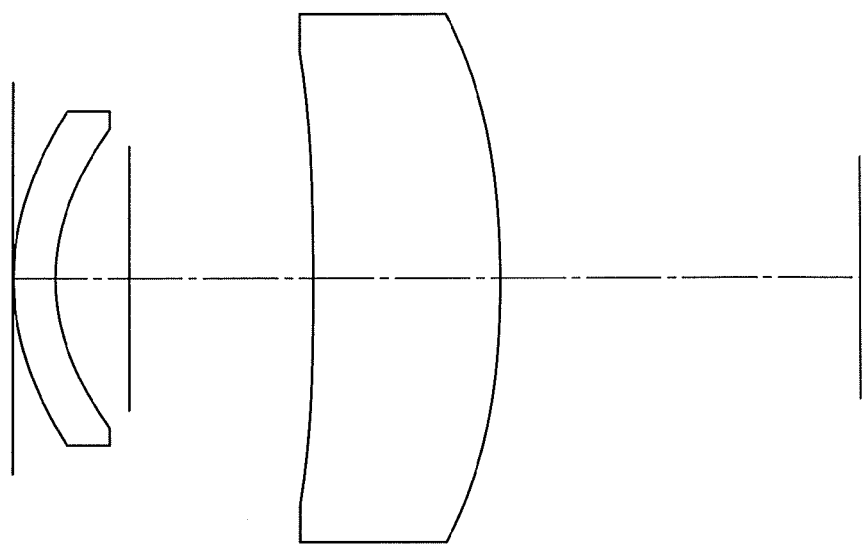
FIG. 21 is a sectional view showing a sixth embodiment of the infrared fixed-focus lens according to the present invention.
Figure 22:
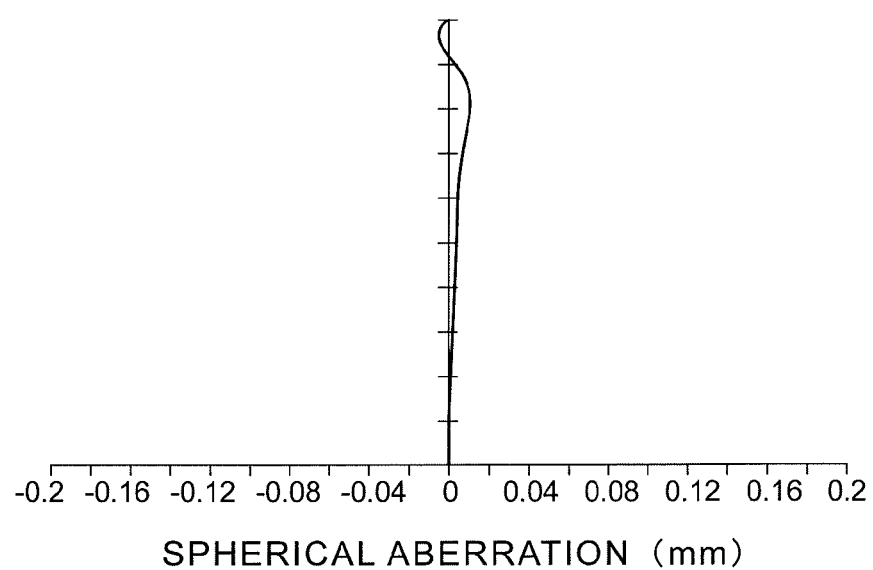
FIG. 22 depicts a graph of spherical aberration developed in the sixth embodiment of the infrared fixed-focus lens.
Figure 23:
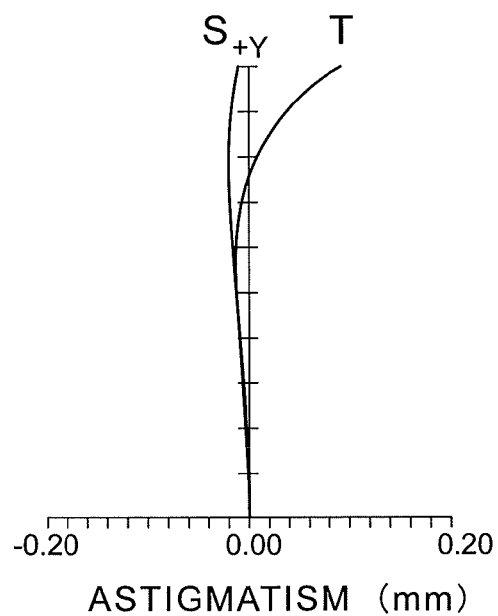
FIG. 23 depicts graphs of astigmatism developed in the sixth embodiment of the infrared fixed-focus lens.
Figure 24:
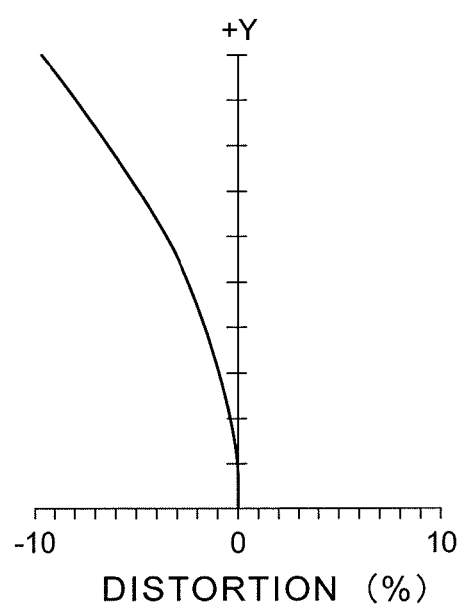
FIG. 24 depicts a graph of distortion developed in the sixth embodiment of the infrared fixed-focus lens.
Figure 25:
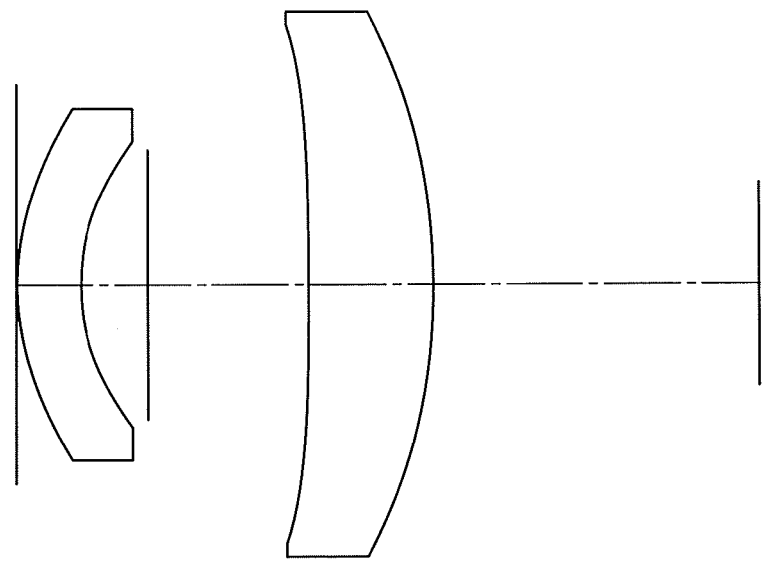
FIG. 25 is a sectional view showing a seventh embodiment of the infrared fixed-focus lens according to the present invention.
Figure 26:
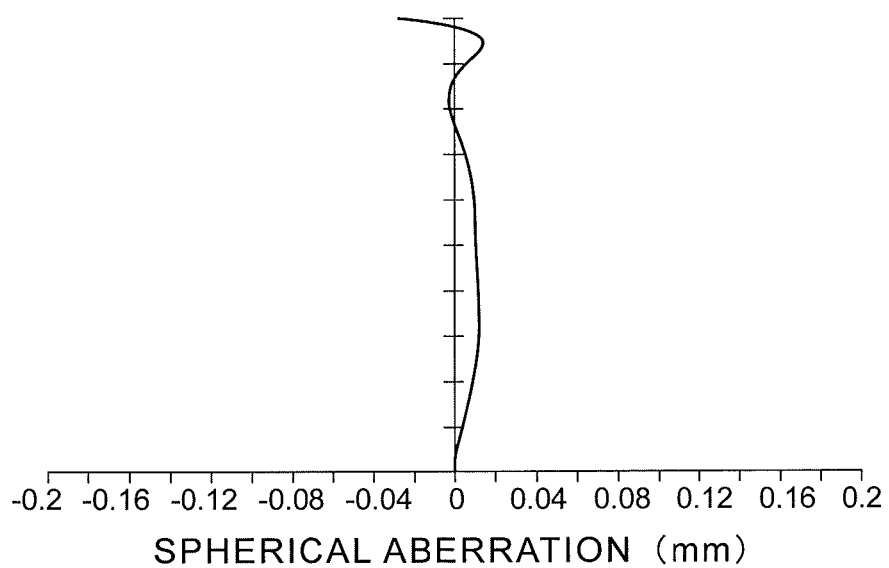
FIG. 26 depicts a graph of spherical aberration developed in the seventh embodiment of the infrared fixed-focus lens.
Figure 27:
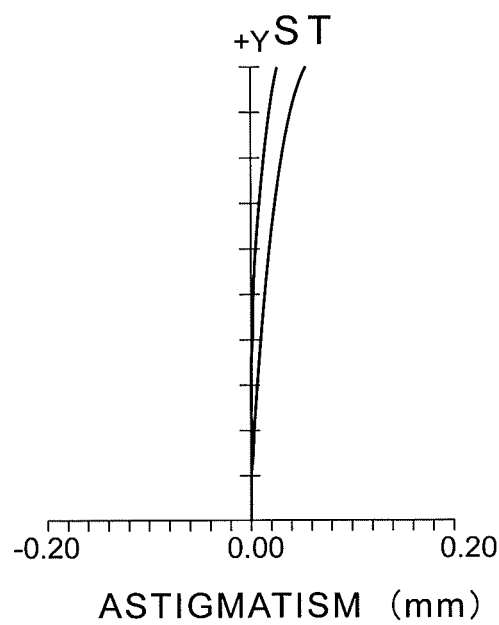
FIG. 27 depicts graphs of astigmatism developed in the seventh embodiment of the infrared fixed-focus lens.
Figure 28:
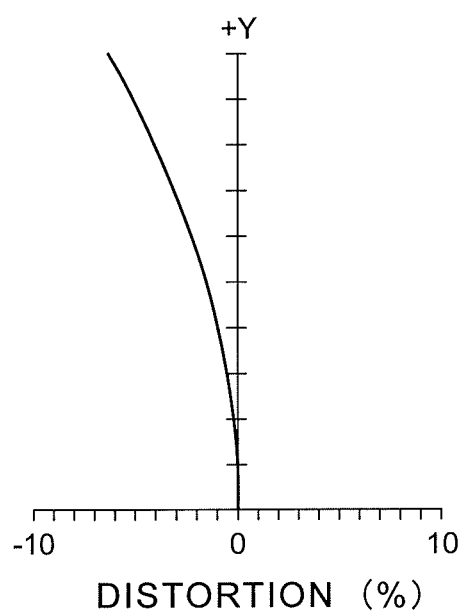
FIG. 28 depicts a graph of distortion developed in the seventh embodiment of the infrared fixed-focus lens.
Figure 29:
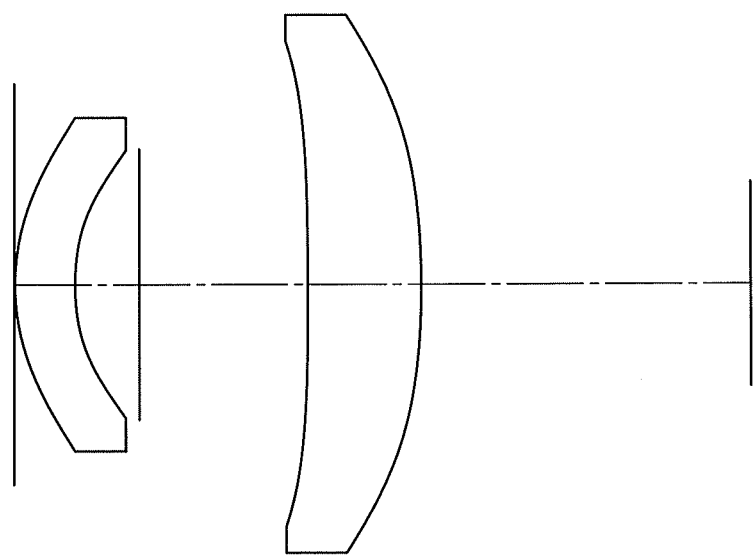
FIG. 29 is a sectional view showing an eighth embodiment of the infrared fixed-focus lens according to the present invention.
Figure 30:
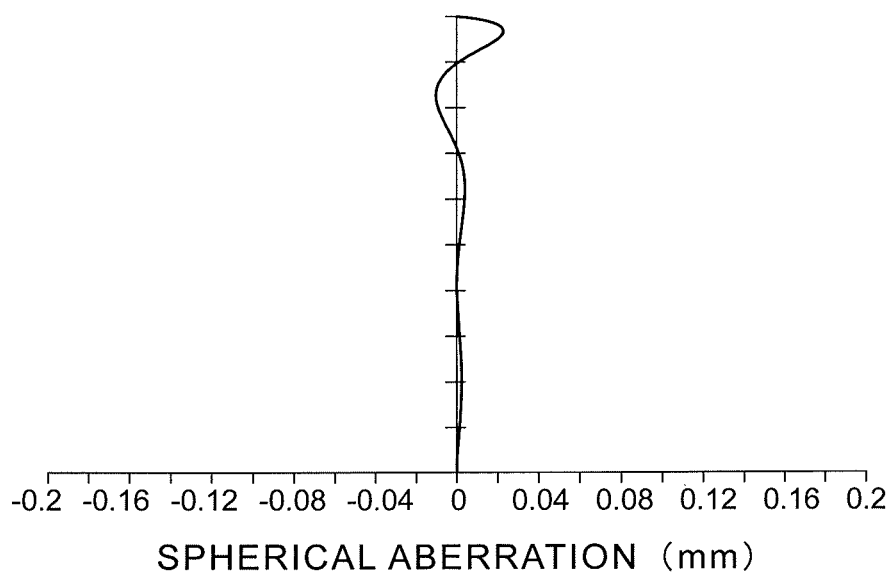
FIG. 30 depicts a graph of spherical aberration developed in the eighth embodiment of the infrared fixed-focus lens.
Figure 31:
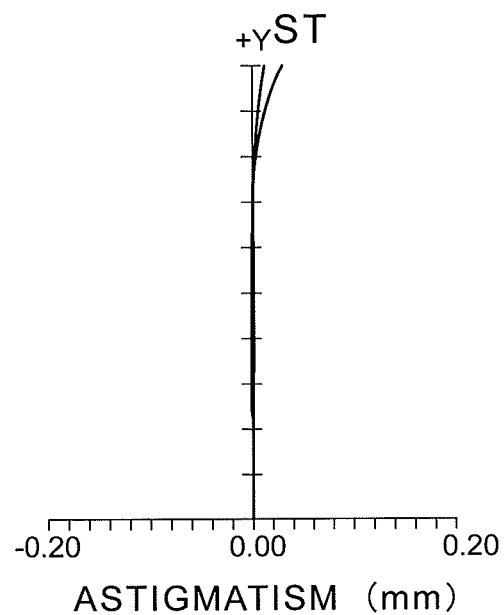
FIG. 31 depicts graphs of astigmatism developed in the eighth embodiment of the infrared fixed-focus lens.
Figure 32:
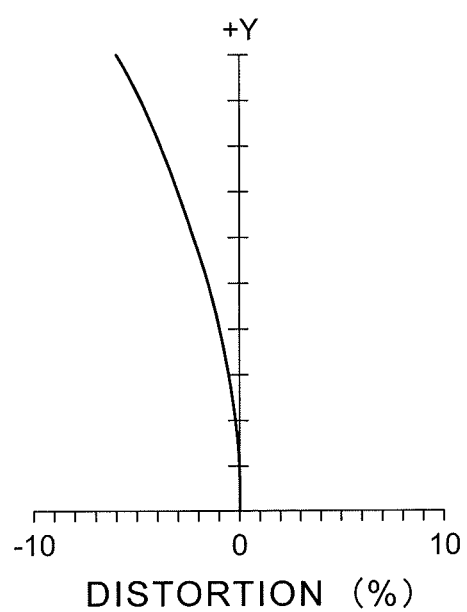
FIG. 32 depicts a graph of distortion developed in the eighth embodiment of the infrared fixed-focus lens.

Detailed below will be data of each of the embodiments of the infrared fixed-focus lens in accordance with the present invention. All of the exemplary infrared fixed-focus lenses are identical in wavelength of 10 μm.

Embodiment 1

| | Focal Length 8.4 mm | | |
| | F num. F/1.0 | | |
| | Angle of Field 2ω = 50° | | |
| Surface # | Radius of Curvature | Distance between Adjacent Lens Pieces/Lens Thickness | Lens Material |
| --- | --- | --- | --- |
| r1 (ASPH) | 28.1198 | 2.5000 | Germanium |
| r2 (ASPH) | 18.4848 | 2.0002 | |
| r3 (STOP) | | 12.0905 | |
| r4 (ASPH) | −366.6150 | 6.0000 | Germanium |
| r5 (ASPH) | −28.1404 | 13.9190 | |

Aspheric surfaces can be expressed as in the following formula (3):

$$X = \frac{H^2/R}{1 + \sqrt{1 - (\varepsilon H^2/R^2)}} + AH^2 + BH^4 + CH^6 + DH^8 + EH^{10} \quad (3)$$

where X is an aspherized shape, R is a radius of curvature, c is a conic constant, and H is a height from the optical axis (in millimeters).

Coefficients, A, B, C, D and E, for the aspheric surfaces as expressed by the formula take their respective values as follows:

| Surface # | 0 (EP) | 2 (A) | 4 (B) | 6 (C) | 8 (D) | 10 (E) |
| --- | --- | --- | --- | --- | --- | --- |
| r1 | 1.0000 | 0.0000E+00 | 4.8636E−04 | −2.0284E−06 | 2.7596E−08 | 2.9694E−10 |
| r2 | 1.0000 | 0.0000E+00 | 7.7063E−04 | 8.9604E−06 | −2.9221E−07 | 1.7511E−08 |
| r4 | 1.0000 | 0.0000E+00 | −1.4004E−05 | −9.9035E−08 | 8.7376E−10 | −2.4866E−12 |
| r5 | 1.0000 | 0.0000E+00 | 8.0977E−06 | −9.9537E−08 | 5.9356E−10 | −1.4124E−12 |

The value related to formula (1) is given as follows: $f1/f = -2.650$

The value related to formula (2) is determined as follows: $d/f = 1.677$

Embodiment 2

Focal Length 8.34 mm
F num. F/1.0
Angle of Field $2\omega = 49.66°$

| Surface # | Radius of Curvature | Distance between Adjacent Lens Pieces/Lens Thickness | Lens Material |
|---|---|---|---|
| r1 (ASPH) | 15.0696 | 2.5000 | Germanium |
| r2 (ASPH) | 11.4999 | 2.0002 | |
| r3 (STOP) | | 11.2654 | |
| r4 (ASPH) | 331.4916 | 6.0000 | Germanium |
| r5 (ASPH) | −28.1834 | 10.7824 | |

Coefficients, A, B, C, D and E, for the aspheric surfaces as expressed by the formula take their respective values as follows:

| Surface # | 0 (EP) | 2 (A) | 4 (B) | 6 (C) | 8 (D) | 10 (E) |
|---|---|---|---|---|---|---|
| r1 | 1.0000 | 0.0000E+00 | 3.5965E−04 | 3.8914E−06 | −1.0751E−07 | 2.6374E−09 |
| r2 | 1.0000 | 0.0000E+00 | 7.2485E−04 | 2.6149E−05 | −1.2666E−06 | 6.2477E−08 |
| r4 | 1.0000 | 0.0000E+00 | −2.5357E−05 | −9.5073E−08 | 8.5019E−10 | −2.0664E−12 |
| r5 | 1.0000 | 0.0000E+00 | 8.3342E−06 | −1.2120E−07 | 6.1565E−10 | −1.2373E−12 |

The value related to formula (1) is given as follows: $f1/f = -4.070$

The value related to formula (2) is determined as follows: $d/f = 1.590$

Embodiment 3

Focal Length 8.40 mm
F num. F/1.0
Angle of Field $2\omega = 50.48°$

| Surface # | Radius of Curvature | Distance between Adjacent Lens Pieces/Lens Thickness | Lens Material |
|---|---|---|---|
| r1 (ASPH) | 47.5084 | 2.5000 | Germanium |
| r2 (ASPH) | 20.8183 | 1.5000 | |
| r3 (STOP) | | 14.2683 | |
| r4 (ASPH) | −104.8620 | 6.0000 | Germanium |
| r5 (ASPH) | −27.6387 | 19.7897 | |

Coefficients, A, B, C, D and E, for the aspheric surfaces as expressed by the formula take their respective values as follows:

| Surface # | 0 (EP) | 2 (A) | 4 (B) | 6 (C) | 8 (D) | 10 (E) |
|---|---|---|---|---|---|---|
| r1 | 1.0000 | 0.0000E+00 | 6.0412E−04 | −5.2552E−06 | 3.9653E−08 | 2.9914E−10 |
| r2 | 1.0000 | 0.0000E+00 | 8.0092E−04 | 1.8934E−05 | −1.0322E−06 | 2.8721E−08 |
| r4 | 1.0000 | 0.0000E+00 | −6.6122E−06 | −1.0390E−07 | 8.7916E−10 | −2.5811E−12 |
| r5 | 1.0000 | 0.0000E+00 | 7.5210E−06 | −9.1623E−08 | 5.8044E−10 | −1.3942E−12 |

The value related to formula (1) is given as follows: $f1/f=-1.580$

The value related to formula (2) is determined as follows: $d/f=1.877$

Embodiment 4

Focal Length 11.6 mm
F num. F/1.0
Angle of Field $2\omega = 35.2°$

| Surface # | Radius of Curvature | Distance between Adjacent Lens Pieces/Lens Thickness | Lens Material |
|---|---|---|---|
| r1 (ASPH) | 18.1488 | 2.0000 | Germanium |
| r2 (ASPH) | 13.3615 | 18.9283 | |
| r3 (STOP) | | 0.5000 | |
| r4 (ASPH) | 512.5988 | 6.5000 | Germanium |
| r5 (ASPH) | −45.1966 | 20.4043 | |

Coefficients, A, B, C, D and E, for the aspheric surfaces as expressed by the formula take their respective values as follows:

| Surface # | 0 (EP) | 2 (A) | 4 (B) | 6 (C) | 8 (D) | 10 (E) |
|---|---|---|---|---|---|---|
| r1 | −13.8410 | 0.0000E+00 | 3.1570E−04 | −3.0495E−06 | 2.3921E−08 | −1.0937E−10 |
| r2 | −8.5596 | 0.0000E+00 | 5.2940E−04 | −4.6784E−06 | 4.1185E−08 | −1.7221E−10 |
| r4 | −299.0000 | 0.0000E+00 | −1.8928E−05 | −6.9160E−09 | −6.3805E−11 | −1.6919E−12 |
| r5 | −0.0565 | 0.0000E+00 | 1.0974E−05 | −2.0749E−08 | 8.0414E−11 | −1.0684E−12 |

The value related to formula (1) is given as follows: $f1/f=-2.110$

The value related to formula (2) is determined as follows: $d/f=1.675$

Embodiment 5

Focal Length 13.0 mm
F num. F/1.0
Angle of Field $2\omega = 33.7°$

| Surface # | Radius of Curvature | Distance between Adjacent Lens Pieces/Lens Thickness | Lens Material |
|---|---|---|---|
| r1 (ASPH) | 20.0889 | 2.0000 | Germanium |
| r2 (ASPH) | 14.2694 | 3.0212 | |
| r3 (STOP) | | 11.2274 | |
| r4 (ASPH) | −96.5908 | 9.0000 | Germanium |
| r5 (ASPH) | −31.3032 | 23.1695 | |

Coefficients, A, B, C, D and E, for the aspheric surfaces as expressed by the formula take their respective values as follows:

| Surface # | 0 (EP) | 2 (A) | 4 (B) | 6 (C) | 8 (D) | 10 (E) |
|---|---|---|---|---|---|---|
| r1 | −14.223 | 0.0000E+00 | 2.9998E−04 | −2.7714E−06 | 1.0555E−08 | −3.4876E−11 |
| r2 | −7.2342 | 0.0000E+00 | 4.9252E−04 | −3.4672E−06 | 9.4283E−09 | −3.8809E−11 |
| r4 | −19.2590 | 0.0000E+00 | −1.6900E−05 | −3.1649E−08 | 2.0797E−10 | −3.9529E−13 |
| r5 | −0.5099 | 0.0000E+00 | −9.5023E−06 | −1.4561E−08 | 4.5904E−11 | −7.7887E−14 |

The value related to formula (1) is given as follows: f1/f=−1.690

The value related to formula (2) is determined as follows: d/f=1.096

Embodiment 6

| | Focal Length 14.0 mm | | |
| | F num. F/1.0 | | |
| | Angle of Field 2ω = 29.0° | | |
| Surface # | Radius of Curvature | Distance between Adjacent Lens Pieces/Lens Thickness | Lens Material |
| --- | --- | --- | --- |
| r1 (ASPH) | 11.7536 | 2.0000 | Germanium |
| r2 (ASPH) | 9.4479 | 3.6436 | |

| Surface # | 0 (EP) | 2 (A) | 4 (B) | 6 (C) | 8 (D) | 10 (E) |
| --- | --- | --- | --- | --- | --- | --- |
| r1 | −4.1759 | 0.0000E+00 | 3.5412E−04 | −2.4250E−06 | −7.2097E−09 | 3.2997E−11 |
| r2 | −3.6564 | 0.0000E+00 | 6.4071E−04 | −5.1496E−06 | −2.6194E−08 | 2.8147E−10 |
| r4 | −296.2005 | 0.0000E+00 | −2.3498E−05 | −2.2624E−08 | 4.2089E−10 | 1.6620E−13 |
| r5 | −0.0485 | 0.0000E+00 | −1.3375E−05 | 1.3024E−08 | −6.4911E−11 | 5.7622E−13 |

-continued

| | Focal Length 14.0 mm | | |
| | F num. F/1.0 | | |
| | Angle of Field 2ω = 29.0° | | |
| Surface # | Radius of Curvature | Distance between Adjacent Lens Pieces/Lens Thickness | Lens Material |
| --- | --- | --- | --- |
| r3 (STOP) | | 8.6541 | |
| r4 (ASPH) | −251.7730 | 9.0000 | Germanium |
| r5 (ASPH) | −34.4485 | 17.1821 | |

Coefficients, A, B, C, D and E, for the aspheric surfaces as expressed by the formula take their respective values as follows:

The value related to formula (1) is given as follows: f1/f=−3.270

The value related to formula (2) is determined as follows: d/f=0.878

Embodiment 7

| | Focal Length 17.4 mm | | |
| | F num. F/1.0 | | |
| | Angle of Field 2ω = 25.0° | | |
| Surface # | Radius of Curvature | Distance between Adjacent Lens Pieces/Lens Thickness | Lens Material |
| --- | --- | --- | --- |
| r1 (ASPH) | 14.2592 | 3.4862 | Germanium |
| r2 (ASPH) | 10.9723 | 3.5256 | |
| r3 (STOP) | | 8.5719 | |
| r4 (ASPH) | −315.8400 | 6.5000 | Germanium |
| r5 (ASPH) | −38.1065 | 17.5788 | |

Coefficients, A, B, C, D and E, for the aspheric surfaces as expressed by the formula take their respective values as follows:

| Surface # | 0 (EP) | 2 (A) | 4 (B) | 6 (C) | 8 (D) | 10 (E) |
| --- | --- | --- | --- | --- | --- | --- |
| r1 | −5.4326 | 0.0000E+00 | 2.6262E−04 | −2.2230E−06 | 1.3209E−08 | −6.4906E−11 |
| r2 | −4.6588 | 0.0000E+00 | 5.2710E−04 | −5.7051E−06 | 3.9613E−08 | −2.4558E−10 |
| r4 | −1761.2065 | 0.0000E+00 | −2.6279E−05 | 3.6214E−08 | −2.7175E−10 | 5.4799E−13 |
| r5 | 0.5506 | 0.0000E+00 | −1.4342E−05 | 1.6966E−09 | −6.8841E−11 | 6.1109E−14 |

The value related to formula (1) is given as follows: f1/f=−4.450

The value related to formula (2) is determined as follows: d/f=0.695

Embodiment 8

| Surface # | Radius of Curvature | Distance between Adjacent Lens Pieces/Lens Thickness | Lens Material |
| --- | --- | --- | --- |
| Focal Length 18.0 mm F num. F/1.0 Angle of Field 2ω = 24.2° | | | |
| r1 (ASPH) | 14.1777 | 3.3541 | Germanium |
| r2 (ASPH) | 10.9526 | 3.6873 | |
| r3 (STOP) | | 9.7003 | |
| r4 (ASPH) | −263.0890 | 6.5000 | Germanium |
| r5 (ASPH) | −38.9490 | 18.8436 | |

Coefficients, A, B, C, D and E, for the aspheric surfaces as expressed by the formula take their respective values as follows:

| Surface # | 0 (EP) | 2 (A) | 4 (B) | 6 (C) | 8 (D) | 10 (E) |
| --- | --- | --- | --- | --- | --- | --- |
| r1 | −5.3215 | 0.0000E+00 | 2.6462E−04 | −2.2148E−06 | 1.2973E−08 | −5.6049E−11 |
| r2 | −4.6137 | 0.0000E+00 | 5.2576E−04 | −5.7043E−06 | 4.1097E−08 | −2.2002E−10 |
| r4 | −1100.9734 | 0.0000E+00 | −2.6769E−05 | 3.4804E−08 | −3.0465E−10 | 6.7690E−13 |
| r5 | 0.4567 | 0.0000E+00 | −1.4223E−05 | −4.1783E−10 | −7.5520E−11 | 9.8844E−14 |

The value related to formula (1) is given as follows: f1/f=−4.050

The value related to formula (2) is determined as follows: d/f=0.743

What is claimed is:

1. A dual-lens infrared fixed-focus lens, comprising:
    a first lens piece disposed closer to an object, wherein the first lens piece has a convex object-side surface and exhibits negative power, and
    a second lens piece disposed closer to an image plane, wherein the second lens piece has a convex image-side surface and exhibits positive power,
    both the first and second lens pieces being made of germanium and being positioned relative to each other according to the following formula:

$$0.6 \leq d/f \leq 1.9$$

where d is a distance from the first lens piece to the second lens piece and f is a focal length of the fixed-focus lens.

2. The dual-lens infrared fixed-focus lens according to claim 1,
    wherein the fixed-focus lens meets the requirement as defined in the following formula (1):

$$-4.5 \leq f1/f \leq -1.55 \qquad (1)$$

where f1 is a focal length of the first lens piece, and f is a focal length of the fixed-focus lens.

* * * * *